United States Patent
Su

(10) Patent No.: US 9,997,925 B2
(45) Date of Patent: Jun. 12, 2018

(54) POWER SUPPLYING METHOD AND DEVICE THEREOF

(71) Applicant: Getac Technology Corporation, Hsinchu County (TW)

(72) Inventor: Huang-Wen Su, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 208 days.

(21) Appl. No.: 15/209,863

(22) Filed: Jul. 14, 2016

(65) Prior Publication Data

US 2018/0019596 A1    Jan. 18, 2018

(51) Int. Cl.
| | |
|---|---|
| *H02J 1/00* | (2006.01) |
| *H02J 3/00* | (2006.01) |
| *H02J 4/00* | (2006.01) |
| *H02J 7/00* | (2006.01) |
| *H02M 1/32* | (2007.01) |
| *H02M 1/08* | (2006.01) |
| *H02M 1/00* | (2006.01) |

(52) U.S. Cl.
CPC ............ *H02J 4/00* (2013.01); *H02J 7/0068* (2013.01); *H02M 1/08* (2013.01); *H02M 1/32* (2013.01); *H02M 2001/0009* (2013.01)

(58) Field of Classification Search
USPC .......................................................... 307/11
See application file for complete search history.

(56) References Cited

U.S. PATENT DOCUMENTS

| | | | | |
|---|---|---|---|---|
| 7,391,257 B1* | 6/2008 | Denison | ............... | A61B 5/0002 |
| | | | | 330/10 |
| 7,492,219 B1* | 2/2009 | Cyrusian | ................. | H03F 3/217 |
| | | | | 330/10 |
| 9,705,395 B2* | 7/2017 | Tomas | ..................... | H02M 1/32 |
| 9,846,469 B2* | 12/2017 | Tomas | ..................... | G06F 1/305 |
| 2006/0022656 A1* | 2/2006 | Leung | ................... | H02M 3/157 |
| | | | | 323/283 |
| 2006/0083037 A1* | 4/2006 | Leung | ............... | H02M 3/33576 |
| | | | | 363/98 |
| 2008/0164934 A1* | 7/2008 | Hankey | .............. | H01R 13/2428 |
| | | | | 327/407 |

(Continued)

*Primary Examiner* — Adam Houston

(74) *Attorney, Agent, or Firm* — Locke Lord LLP; Tim Tingkang Xia, Esq.

(57) ABSTRACT

A power supplying method is adapted to supply power to any one of external electronic devices with voltage-stabilized capacitors of different specifications. The power supplying method includes: generating a periodic signal; periodically turning on and off a load-switch circuit by the periodic signal to enable the load-switch circuit to periodically charge and discharge the voltage-stabilized capacitor; generating an enable signal following the periodic signal; continuously turning on the load-switch circuit by the enable signal to enable the load-switch circuit to supply the power to the external electronic device according to a flag signal; and detecting the amount of a current supplied to the external electronic device by the load-switch circuit to determine a level of the flag signal. During periodically charging and discharging the voltage-stabilized capacitor, the amount of the current supplied to the external electronic device is gradually decreased.

12 Claims, 4 Drawing Sheets

(56) References Cited

U.S. PATENT DOCUMENTS

| | | | | |
|---|---|---|---|---|
| 2010/0328849 A1* | 12/2010 | Ewing | G06F 1/266 | 361/622 |
| 2011/0267731 A1* | 11/2011 | Amadi | H03F 1/523 | 361/93.1 |
| 2011/0267843 A1* | 11/2011 | Djenguerian | H02M 1/32 | 363/21.01 |
| 2011/0317317 A1* | 12/2011 | Liu | H03K 17/284 | 361/56 |
| 2012/0155127 A1* | 6/2012 | Brokaw | H02M 1/36 | 363/49 |
| 2013/0043850 A1* | 2/2013 | Zhu | H02M 3/156 | 323/271 |
| 2013/0094248 A1* | 4/2013 | Jacques | H02M 3/3385 | 363/19 |
| 2013/0249319 A1* | 9/2013 | Cummings | H01L 31/02021 | 307/131 |
| 2013/0289922 A1* | 10/2013 | Hess | H02M 1/32 | 702/108 |
| 2014/0078629 A1* | 3/2014 | Cortigiani | H03K 17/0822 | 361/79 |
| 2014/0085762 A1* | 3/2014 | Shimano | H02M 1/08 | 361/91.6 |
| 2014/0160809 A1* | 6/2014 | Lin | H02M 3/33523 | 363/21.16 |
| 2014/0184116 A1* | 7/2014 | Berringer | H02P 21/06 | 318/400.09 |
| 2014/0268939 A1* | 9/2014 | Tomas | H02H 7/1225 | 363/50 |
| 2014/0277802 A1* | 9/2014 | Tomas | G06F 1/30 | 700/292 |
| 2014/0328090 A1* | 11/2014 | Takahashi | H02M 3/33507 | 363/21.17 |
| 2015/0123580 A1* | 5/2015 | Omata | H02P 29/032 | 318/400.17 |
| 2015/0357904 A1* | 12/2015 | Odell | H03K 17/284 | 363/21.13 |
| 2016/0091147 A1* | 3/2016 | Jiang | F21V 3/061 | 315/205 |
| 2016/0204717 A1* | 7/2016 | Li | H02N 2/181 | 310/319 |
| 2016/0284303 A1* | 9/2016 | Dai | G09G 3/36 | |
| 2016/0301306 A1* | 10/2016 | Jiang | H02M 1/08 | |
| 2016/0370420 A1* | 12/2016 | Langley | G01R 31/1272 | |
| 2017/0201086 A1* | 7/2017 | Chen | H02H 3/08 | |
| 2017/0201180 A1* | 7/2017 | Jacques | H02M 3/33507 | |
| 2017/0245040 A1* | 8/2017 | Hankey | H04M 1/05 | |
| 2017/0250616 A1* | 8/2017 | Takahashi | H02M 3/33546 | |
| 2017/0272158 A1* | 9/2017 | Wang | H04B 10/25 | |
| 2017/0331326 A1* | 11/2017 | Hanley | H02J 9/061 | |
| 2018/0019596 A1* | 1/2018 | Su | H02J 4/00 | |
| 2018/0048140 A1* | 2/2018 | Takuma | H02H 3/08 | |

* cited by examiner (1)

POWER SUPPLYING METHOD AND DEVICE THEREOF

BACKGROUND OF THE INVENTION

Field of the Invention

The present invention relates to a power supplying technique and, more particularly, to a power supplying method and device thereof.

Description of the Prior Art

There are many kinds of load-switch integrated circuits (ICs) which are commercially available. Generally, a load-switch IC is provided with an over-current protection (OCP) mechanism. The OCP protection mechanism includes one or more protective conditions. If all of the conditions are satisfied, the load-switch IC switches to a protection mode. Under the protection mode, the load-switch IC is in a non-operational state unless the protection mode is off. Thus the OCP protection mechanism is relatively secure for avoiding risks of working over the conditions of the OCP protection mechanism. For example, a high current generated along with the occurrence of a short circuit (short to ground) may cause an electronic device being burnt and even lead to fire accident.

By setting a threshold of over-current protection (a critical current), the OCP protection mechanism can determine whether an output current is over the threshold of over-current protection. In addition to setting the critical current, an over-current event can be determined whether it is a long-time event or a short-time event based upon a blanking time. For example, if the blanking time is set to 0.5 ms and an over-current event occurs and lasts over 0.5 ms, the load-switch IC will be latched off. The mechanism of an over-current protection of the load-switch IC is enough in most situations. Nevertheless, some electronic devices include voltage-stabilized capacitors with great capacitances in their front ends, which cause instantaneous high currents (not less than the critical current during the blanking time) in an initial charging stage, and, consequently, the load-switch ICs will switch to the protection mode and cannot charge the electronic devices.

To address the above issues, the easiest manner is raising the critical current such that the load-switch IC can operates normally. However, since voltage-stabilized capacitors in different electronic devices may have different capacitances, the manner of raising the critical current may cause that the protection of the OCP mechanism of the load-switch IC is no longer strictly.

SUMMARY OF THE INVENTION

In an embodiment, a power supplying method is adapted to supply power to any of external electronic devices with voltage-stabilized capacitors of different specifications. The power supplying method comprises: generating a periodic signal; periodically turning on and off a load-switch circuit by the periodic signal to enable the load-switch circuit to periodically charge and discharge the voltage-stabilized capacitor; generating an enable signal following the periodic signal; continuously turning on the load-switch circuit by the enable signal to enable the load-switch circuit to supply the power to the external electronic device according to a flag signal; and detecting the amount of a current supplied to the external electronic device by the load-switch circuit to determine a level of the flag signal. During periodically charging and discharging the voltage-stabilized capacitor, the amount of the current supplied to the external electronic device is gradually decreased.

In an embodiment, a power supplying device is adapted to supply power to any one of external electronic devices with voltage-stabilized capacitors of different specifications. The power supplying device comprises: a signal generating circuit, a supply port, and a load-switch circuit. The load-switch circuit is coupled to the signal generating circuit and the supply port. The signal generating circuit is for generating a periodic signal and an enable signal following the periodic signal. The supply port is for being coupled to the external electronic device. When the load-switch circuit receives the periodic signal, the load-switch circuit periodically turns on and off in response to the periodic signal, to periodically charge and discharge the voltage-stabilized capacitor. The load-switch circuit gradually decreases the amount of a current supplied to the external electronic device during periodically charging and discharging the voltage-stabilized capacitor. When the load-switch circuit receives the enable signal, the load-switch circuit supplies the external electronic device according to a flag signal and detects the amount of the current supplied to the external electronic device to determine a level of the flag signal.

Concisely, the power supplying method and device thereof according to embodiments of the present invention are adapted to supply power to any of the external electronic devices with the voltage-stabilized capacitors of different specifications. On the premise that a protection mode of the OCP mechanism is not actuated, the power supplying device charges voltage-stabilized capacitors Cs with great capacitance in advance until the supply voltage reaches a normal working level and then continuously supplies the external electronic device.

BRIEF DESCRIPTION OF THE DRAWINGS

The disclosure will become more fully understood from the detailed description given herein below for illustration only, and thus not limitative of the disclosure, wherein.

DETAILED DESCRIPTION OF THE EMBODIMENTS

Figure 1:
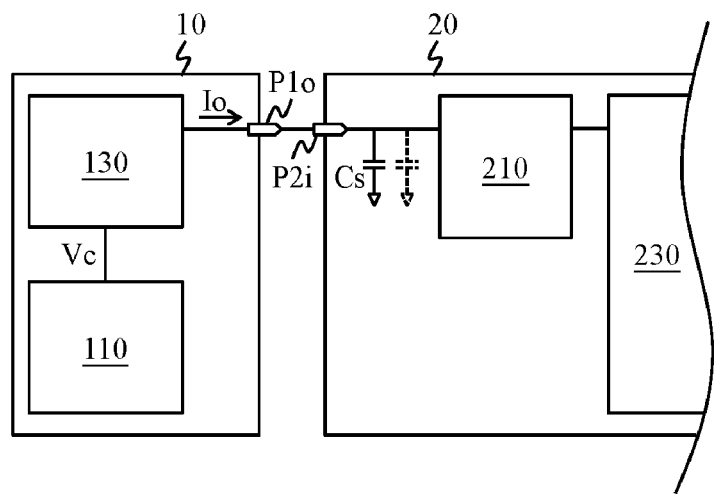
FIG. 1 is a diagram of a power supplying device according to an embodiment of the present invention.

FIG. 1 is a diagram of a power supplying device according to an embodiment of the present invention. Referring to FIG. 1, a power supplying device 10 is adapted to supply power to any one (the external electronic device 20) of the external electronic devices with voltage-stabilized capacitors of different values (different capacitances). In other words, the external electronic device 20 comprises a charging end P2$i$ and at least one voltage-stabilized capacitor Cs. Each voltage-stabilized capacitor Cs is connected to the charging end P2$i$ in parallel. The voltage-stabilized capacitor Cs is coupled between a charge-discharge circuit 210 and the charging end P2*i*. The charge-discharge circuit 210 is coupled between the voltage-stabilized capacitor Cs and a function circuit 230. The charge-discharge circuit 210 receives power inputted from the charging end P2*i* via the voltage-stabilized capacitor Cs and supplies power to the function circuit 230 for operation.

The power supplying device 10 comprises a signal generating circuit 110, a supply port P1*o*, and a load-switch circuit 130. The load-switch circuit 130 is coupled between the signal generating circuit 110 and the supply port P1*o*. The supply port P1*o* of the power supplying device 10 is coupled to the charging end P21 of the external electronic device 20. The supply port P1*o* is hot pluggable.

The signal generating circuit 110 generates a control signal Vc which is provided to the load-switch circuit 130. The load-switch circuit 130 receives the control signal Vc and supplies power to the external electronic device 20 via the supply port Plo according to the control signal Vc.

In the embodiment, the control signal Vc includes two types. One type of the control signal Vc is a periodic signal working in an initial charging stage (referring to a first period T1 of FIG. 4), and the other type of the control signal Vc is an enable signal working in a normal charging stage (referring to a second period T2 of FIG. 4).

In the initial charging stage (referring to the first period T1 of FIG. 4), the signal generating circuit 110 generates the periodic signal and periodically turns on and off the load-switch circuit 130 by the periodic signal, to enable the load-switch circuit 130 to periodically charge and discharge the voltage-stabilized capacitor Cs via the supply port P1*o* and the charging end P2*i*. During periodically charging and discharging the voltage-stabilized capacitor Cs (i.e., in the initial charging stage of generating the periodic signal), the load-switch circuit 130 gradually decreases the amount of a current Io supplied to the external electronic device 20 in response to the periodic signal.

After a predetermined time, the signal generating circuit 110 generates the enable signal following the periodic signal and continuously turns on the load-switch circuit 130 by the enable signal, to enable the load-switch circuit 130 to supply the power to the external electronic device 20 via the supply port P1*o* and the charging end P2*i* according to a flag signal. During generating the enable signal (i.e., in the normal charging stage, as the second period T2 shown in FIG. 4), the load-switch circuit 130 detects the amount of the current Io supplied to the external electronic device 20 and determines a level of the flag signal according to the amount of the current Io being detected. How the level of the flag signal is determined is illustrated later.

The periodic signal is a signal with being repeatedly alternated between a first level and a second level. The enable signal is a signal remaining at the second level. In the embodiment, the first level is higher than the second level. In the embodiment, the time of each second level of the periodic signal is less than that of the second level of the enable signal. In other words, the signal generating circuit 110 outputs the first level and the second level alternatively and repeatedly in a predetermined time and then remains the output at the second level.

In the embodiment, the load-switch circuit 130 is in an on-state while receiving the second level and is in an off-state while receiving the first level.

The technical feature of the embodiments of the present invention is that the power supplying device 10 can effectively increase supply voltage with time and decrease charging current (the amount of the current Io for supplying) simultaneously by properly adjusting the periodically charging and discharging period, i.e., the sum of the times (pulse-width) of the first level and the second level of the periodic signal.

Figure 2:
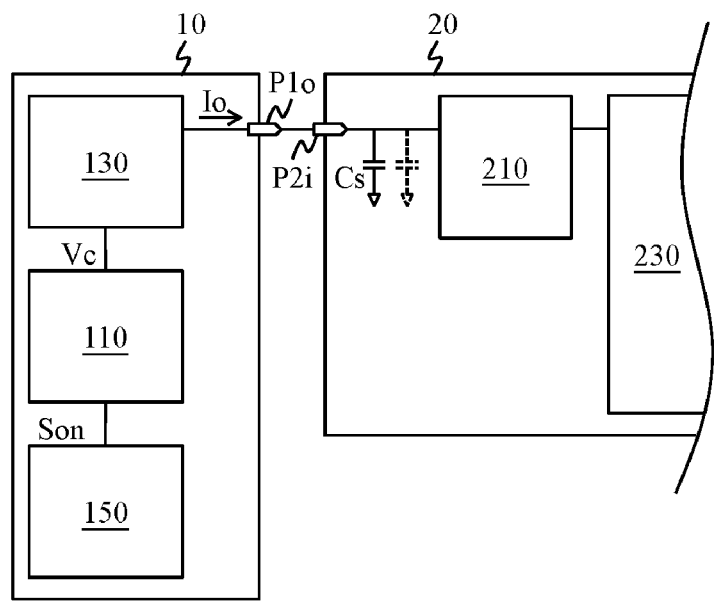
FIG. 2 is a diagram of a power supplying device according to another embodiment of the present invention.

FIG. 2 is a diagram of a power supplying device according to another embodiment of the present invention. In an embodiment, while the supply port P1*o* of the power supplying device 10 is not hot pluggable, the power supplying device 10 can further comprise a start-to-supply unit 150. As shown in FIG. 2, the start-to-supply unit 150 can be a virtual button or a physical button. When the start-to-supply unit 150 is triggered by a user, the start-to-supply unit 150 is enabled to output a start-to-supply signal Son to the signal generating circuit 110. When the signal generating circuit 110 receives the start-to-supply signal Son, the signal generating circuit 110 generates the periodic signal in response to the start-to-supply signal Son. After a predetermined time from generating the periodic signal, the output of the signal generating circuit 110 is altered from the periodic signal of the first period T1 to the enable signal of the second period T2.

Specifically, during generating the enable signal, the load-switch circuit 130 detects the amount of the current Io supplied to the external electronic device 20. When the amount of the current Io being detected does not satisfy a protective condition of an over-current protection (OCP) mechanism, the load-switch circuit 130 generates a flag signal of a third level to enable the load-switch circuit 130 to continuously supply the power to the external electronic device 20 in response to the enable signal. In contrast, when the amount of the current Io being detected satisfies the protective condition of the OCP mechanism, the load-switch circuit 130 generates a flag signal of a fourth level to disable the load-switch circuit 130 to stop supplying the power to the external electronic device 20. In other words, when the flag signal is the third level, the load-switch circuit 130 operates normally, i.e., the load-switch circuit 130 is controlled by the enable signal to continuously supply the external electronic device 20. When the flag signal is the fourth level, the load-switch circuit 130 is forced to disable, i.e., the load-switch circuit 130 is not controlled by the enable signal and is forced to stop supplying the power to the external electronic device 20.

Figure 3:
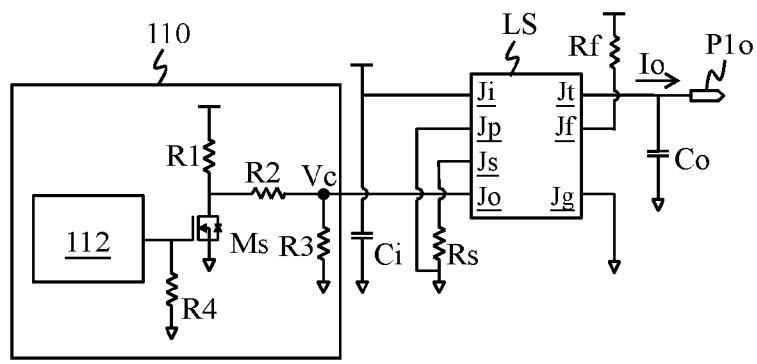
FIG. 3 is a diagram of a power supplying device according to yet another embodiment of the present invention.

FIG. 3 is a diagram of a power supplying device according to yet another embodiment of the present invention. In some embodiments, referring to FIG. 3, the load-switch circuit 130 can be a load-switch integrated circuit (load-switch IC) LS. The load-switch IC LS comprises an on pin Jo and a supply pin Jt. The on pin Jo of the load-switch IC LS is coupled to the signal generating circuit 110 and receives the control signal Vc from the signal generating circuit 110. The supply pin Jt of the load-switch IC LS is coupled to the supply port P1*o* and supplies the external electronic device 20 via the supply port P1*o*.

In some embodiments, the signal generating circuit 110 comprises a grounding switch Ms and a control unit 112. The control unit 112 is coupled to a control end of the grounding switch Ms. A first end of the grounding switch Ms is electrically connected to a power end and the on pin Jo of the load-switch IC LS. A second end of the grounding switch Ms is electrically connected to ground.

The control unit 112 outputs an off signal to the grounding switch Ms to turn off the grounding switch Ms. In the meantime, the on pin Jo of the load-switch IC LS is electrically connected to the power end to increase the level of the on pin Jo of the load-switch IC LS to a high level (i.e., the control signal Vc of the first level). In the meantime, the load-switch IC LS is in a non-operational state.

The control unit 112 outputs an on signal to the grounding switch Ms to turn on the grounding switch Ms. In the meantime, the on pin Jo of the load-switch IC LS is electrically connected to the ground by the grounding switch Ms to decrease the level of the on pin Jo of the load-switch IC LS to a low level (i.e., the control signal Vc of the second level). In the meantime, the load-switch IC LS is in an operational state and supplies power to the supply port P1o via the supply pin Jt.

Figure 4:
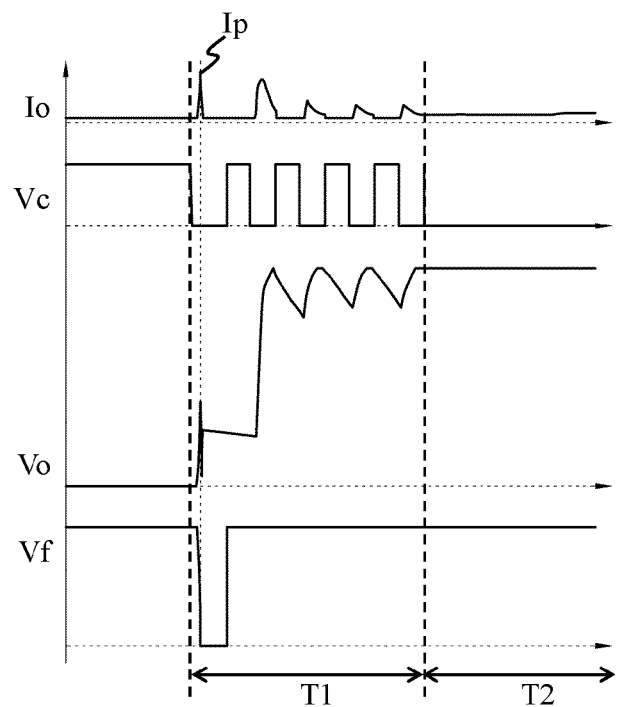
FIG. 4 illustrates waveforms of the signals in FIG. 3.

FIG. 4 illustrates waveforms of the signals in FIG. 3. In the first period T1 (i.e., in the initial charging stage), the control unit 112 turns on and off the grounding switch Ms repeatedly to enable the level of the on pin Jo of the load-switch IC LS to be repeatedly alternated between the high level and the low level (i.e., the periodic signal). Additionally, in the first period T1, an instantaneous high current Ip which is generated along with the start of charging causes the load-switch IC LS to generate a flag signal Vf of the low level (i.e., the flag signal of the fourth level). One of features of the embodiment of the present invention is that the flag signal Vf generated by the load-switch IC LS can be restore to the high level (i.e., a flag signal of a fifth level) by resetting the load-switch IC LS by the periodic signal such that the supply pin Jt of the load-switch IC LS can keep supplying power. In the first period T1, a supply voltage Vo outputted by the supply pin Jt of the load-switch IC LS gradually increases until it is stable. In the meantime, the charging current (the amount of the current Io for supplying) gradually decreases.

Next, in the second period T2 (i.e., in the normal charging stage), the control unit 112 controls the grounding switch MS to have the grounding switch MS remain in an on-state such that the level of the on pin Jo of the load-switch IC LS remains at the low level (i.e., the control signal Vc of the enable signal). In the second period T2, the load-switch IC LS outputs the supply voltage Vo from the supply pin Jt to the supply port P1o according to the level of the flag signal Vf and the level of the control signal Vc (i.e., the enable signal) so as to supply the external electronic device 20.

Herein, the supply pin Jt of the load-switch IC LS is connected to an output capacitor Co. The output capacitor Co is coupled between the supply pin Jt and the ground. Additionally, the load-switch IC LS further comprises a power pin Ji, a power good pin Jp, a current restricting pin Js, a malfunction indicating pin Jf, and a grounding pin Jg. The power pin Ji is electrically connected to the power end. A supply capacitor Ci is coupled between the power pin Ji and the ground. The power good pin Jp is coupled to the ground. The current restricting pin Js is coupled to the ground via a current restricting resistor Rs. The malfunction indicating pin Jf is couple to the power end via a pull-up resistor Rf. The grounding pin Jg is coupled to the ground.

In some embodiments, the signal generating circuit 110 further comprises four resistors R1, R2, R3, and R4. The resistor R1 is coupled between the power end and the first end of the grounding switch Ms. The resistor R2 is coupled between the first end of the grounding switch Ms and the on pin Jo. The resistor R3 is coupled between the on pin Jo and the ground. The resistor R4 is coupled between the control end of the grounding switch Ms and the ground. The second end of the grounding switch Ms is coupled to the ground. The grounding switch Ms can be a metal-oxide semiconductor field effect transistor (MOSFET). The first end, the second end, and the control end of the grounding switch Ms can be a drain, a source, and a gate respectively.

Figure 5:
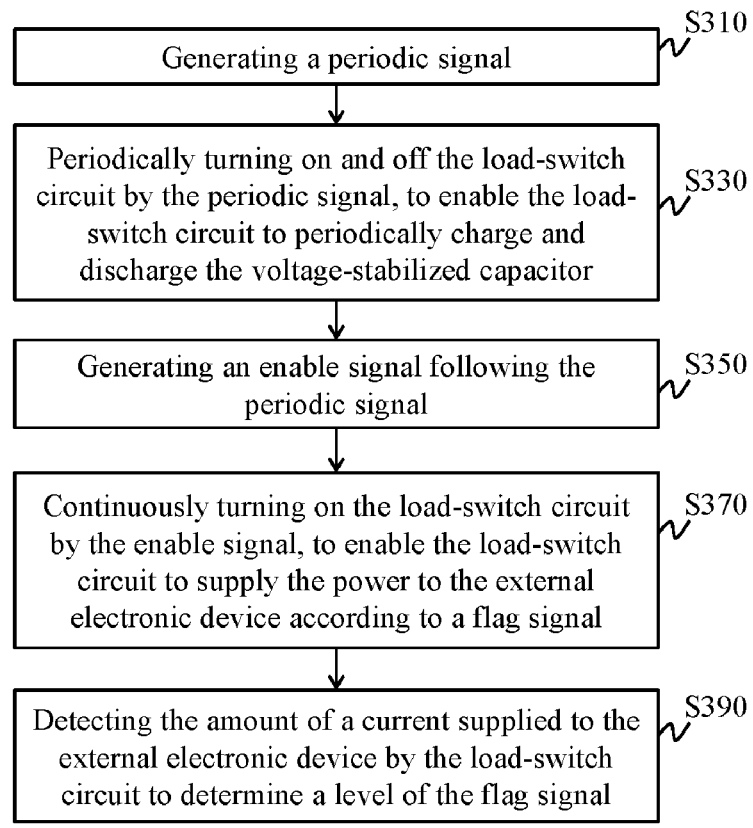
FIG. 5 is a flow chart of a power supplying method according to an embodiment of the present invention.

According to the aforementioned description, the present invention further discloses embodiments of a power supplying method. The power supplying method is adapted to supply power to any one (the external electronic device 20) of the external electronic devices with voltage-stabilized capacitors Cs of different values. FIG. 5 is a flow chart of a power supplying method according to an embodiment of the present invention. The power supplying method comprises: generating a periodic signal (step S310); periodically turning on and off the load-switch circuit 130 by the periodic signal, to enable the load-switch circuit 130 to periodically charge and discharge the voltage-stabilized capacitor Cs (step S330); generating an enable signal following the periodic signal (step S350); continuously turning on the load-switch circuit 130 by the enable signal, to enable the load-switch circuit 130 to supply the power to the external electronic device 20 according to a flag signal Vf (step S370); and detecting the amount of a current Io supplied to the external electronic device 20 by the load-switch circuit 130 to determine a level of the flag signal Vf (step S390). During periodically charging and discharging the voltage-stabilized capacitor Cs, the amount of the current Io supplied to the external electronic device 20 is gradually decreased. As a result, the supply voltage can be effectively increased with time and the charging current (the amount of the current Io for supplying) can be decreased simultaneously by properly adjusting the periodically charging and discharging period, i.e., the sum of the time s (pulse-width) of the first level and the second level of the periodic signal.

In some embodiments, under the circumstance that a hot pluggable function is supported, the periodic signal and the enable signal are generated alternatively and repeatedly (i.e., the step S310 and continuous steps are executed again after the step S390).

Figure 6:
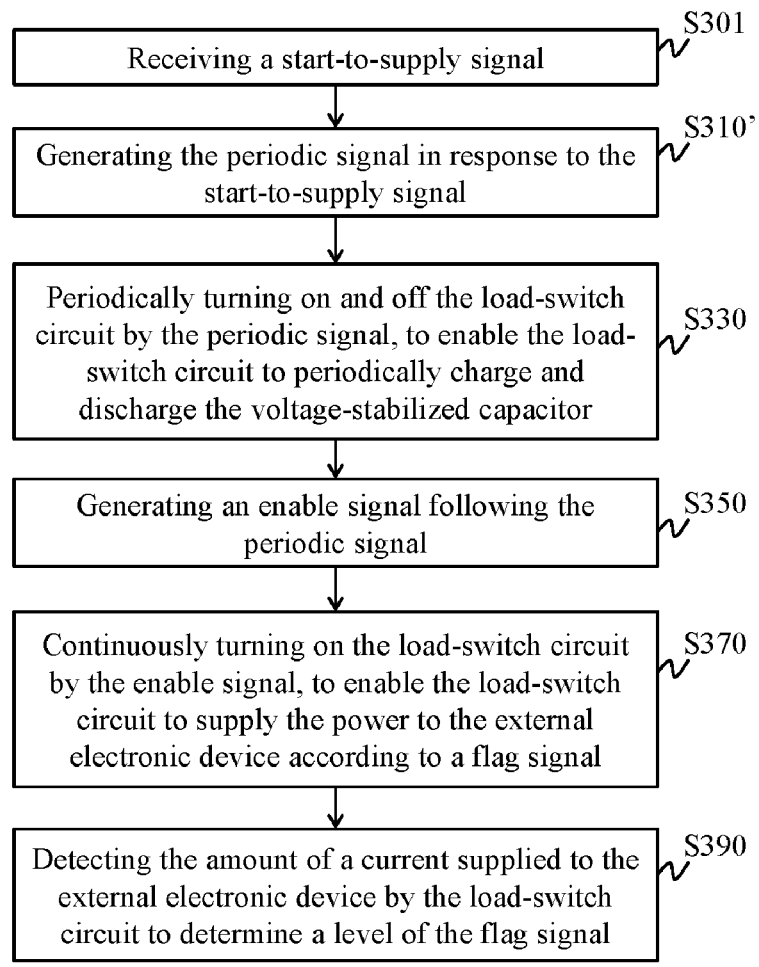
FIG. 6 is a flow chart of a power supplying method according to another embodiment of the present invention.

FIG. 6 is a flow chart of a power supplying method according to another embodiment of the present invention. In some embodiments, under the circumstance that the hot pluggable function is not supported, the power supplying method further comprises receiving a start-to-supply signal (step S301), as shown in FIG. 6. In the meantime, the step S310 is executed in response to the start-to-supply signal, i.e., generating the periodic signal in response to the start-to-supply signal (step S310').

In some embodiments, the periodic signal is a signal with being repeatedly alternated between a first level and a second level. The enable signal is a signal remaining at the second level. The time of each second level of the periodic signal is less than that of the second level of the enable signal.

In the embodiment, the load-switch circuit 130 is in an on-state while receiving the second level and is in an off-state while receiving the first level.

Concisely, the power supplying method and device thereof according to embodiments of the present invention are adapted to supply power to any one of the external electronic devices 20 with the voltage-stabilized capacitors Cs of different specifications. On the premise that a protection mode of the OCP mechanism is not actuated, the power supplying device charges voltage-stabilized capacitors Cs with great capacitance in advance until the supply voltage reaches a normal working level and then continuously supplies the external electronic device 20.

What is claimed is:

1. A power supplying method, adapted to supply power to any one of external electronic devices with voltage-stabilized capacitors of different specifications, the power supplying method comprising:

generating a periodic signal;

periodically turning on and off a load-switch circuit by the periodic signal to enable the load-switch circuit to periodically charge and discharge the at least one voltage-stabilized capacitor, wherein during periodically charging and discharging the at least one voltage-stabilized capacitor, the amount of a current supplied to the external electronic device is gradually decreased;

generating an enable signal following the periodic signal;

continuously turning on the load-switch circuit by the enable signal to enable the load-switch circuit to supply the power to the external electronic device according to a flag signal; and detecting the amount of the current supplied to the external electronic device by the load-switch circuit to determine a level of the flag signal.

2. The power supplying method of claim 1, wherein the periodic signal is a signal with being repeatedly alternated between a first level and a second level, the enable signal is a signal remaining at the second level, and the time of each second level of the periodic signal is less than that of the second level of the enable signal.

3. The power supplying method of claim 2, wherein the load-switch circuit is in an on-state while receiving the second level and is in an off-state while receiving the first level.

4. The power supplying method of claim 1, wherein the periodic signal and the enable signal are generated alternatively and repeatedly.

5. The power supplying method of claim 1, further comprising:

receiving a start-to-supply signal, wherein the step of generating the periodic signal comprises generating the periodic signal in response to the start-to-supply signal.

6. The power supplying method of claim 1, wherein the step of continuously turning on the load-switch circuit by the enable signal to enable the load-switch circuit to supply the power to the external electronic device according to the flag signal comprises:

enabling the load-switch circuit to continuously supply the power to the external electronic device in response to the enable signal when the flag signal is a third level; and disabling the load-switch circuit to stop supplying the power to the external electronic device when the flag signal is a fourth level.

7. A power supplying device, adapted to supply power to any one of external electronic devices with voltage-stabilized capacitors of different specifications, the power supplying device comprising:

a signal generating circuit for generating a periodic signal and an enable signal following the periodic signal;

a supply port for being coupled to the external electronic device; and a load-switch circuit coupled to the signal generating circuit and the supply port;

wherein when the load-switch circuit receives the periodic signal, the load-switch circuit periodically turns on and off in response to the periodic signal to periodically charge and discharge the at least one voltage-stabilized capacitor, and the load-switch circuit gradually decreases the amount of a current supplied to the external electronic device during the periodically charging and discharging the at least one voltage-stabilized capacitor, and wherein when the load-switch circuit receives the enable signal, the load-switch circuit supplies the power to the external electronic device according to a flag signal and detects the amount of the current supplied to the external electronic device to determine a level of the flag signal.

8. The power supplying device of claim 7, wherein the periodic signal is a signal with being repeatedly alternated between a first level and a second level, the enable signal is a signal remaining at a fifth level, and the time of the second level of the periodic signal is less than that of the fifth level of the enable signal.

9. The power supplying device of claim 8, wherein the load-switch circuit is in an on-state while receiving the second level and is in an off-state while receiving the first level.

10. The power supplying device of claim 9, wherein the signal generating circuit generates the periodic signal and the enable signal alternatively and repeatedly.

11. The power supplying device of claim 7, further comprising:

a start-to-supply unit for generating a start-to-supply signal when being triggered, wherein the signal generating circuit receives the start-to-supply signal and generates the periodic signal in response to the start-to-supply signal.

12. The power supplying device of claim 7, wherein when the flag signal is a third level, the load-switch circuit continuously supplies the external electronic device in response to the enable signal; and when the flag signal is a fourth level, the load-switch circuit stops supplying the power to the external electronic device.

* * * * *